No. 755,935. PATENTED MAR. 29, 1904.
W. F. REED.
CLUTCH MECHANISM FOR MOWING MACHINES.
APPLICATION FILED AUG. 30, 1902.
NO MODEL. 2 SHEETS—SHEET 1.
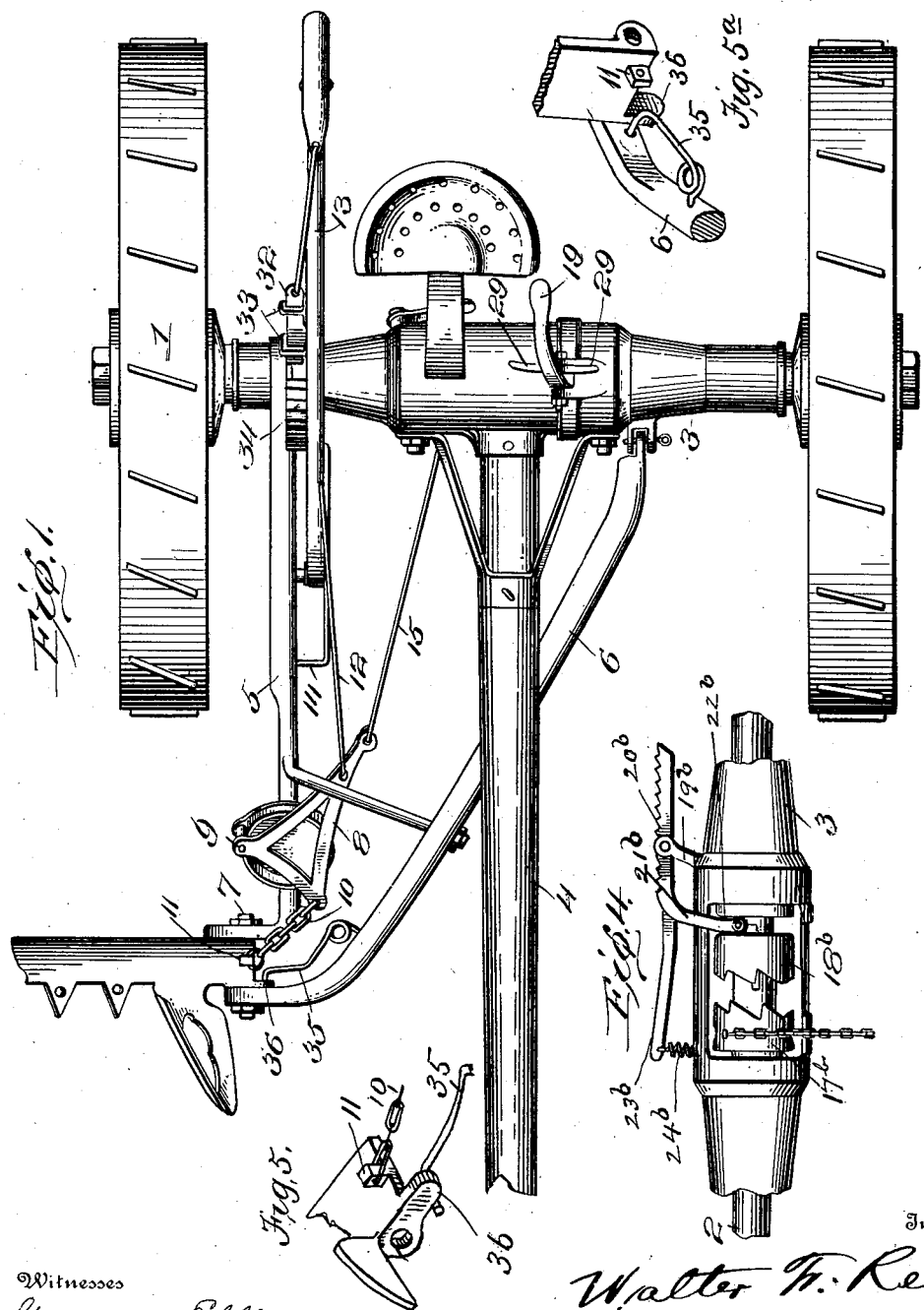
Witnesses
Gertrude Ellis.
Harry A. Chick
Inventor
Walter F. Reed
John A. Saul
Attorney No. 755,935. PATENTED MAR. 29, 1904.
W. F. REED.
CLUTCH MECHANISM FOR MOWING MACHINES.
APPLICATION FILED AUG. 30, 1902.
NO MODEL. 2 SHEETS—SHEET 2.
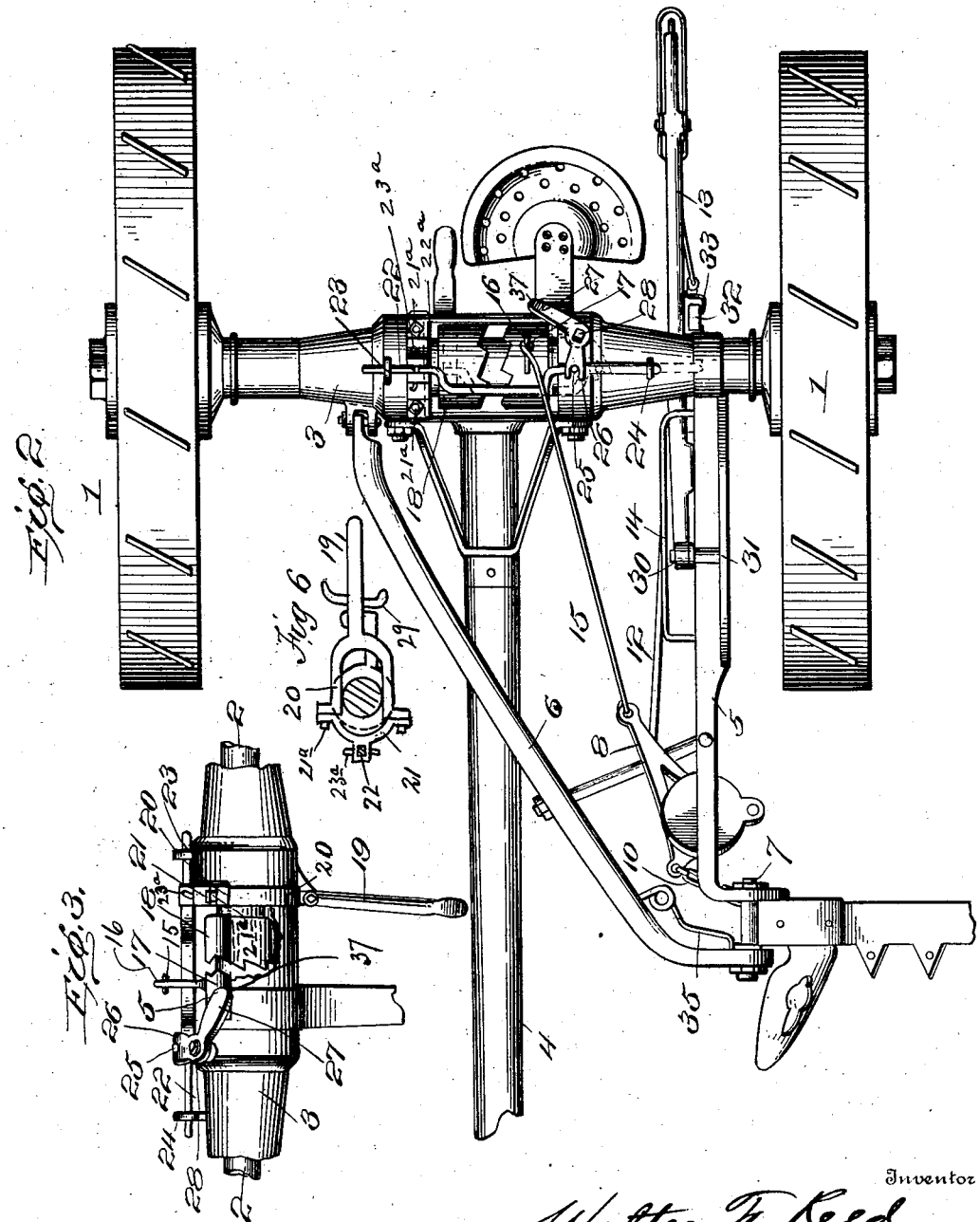
Witnesses
J. M. Fowler Jr.
Harry A. Chick
Inventor
Walter F. Reed
By John A. Saul
Attorney No. 755,935. Patented March 29, 1904.

UNITED STATES PATENT OFFICE.

WALTER F. REED, OF CAMDEN, SOUTH CAROLINA.

CLUTCH MECHANISM FOR MOWING-MACHINES.

SPECIFICATION forming part of Letters Patent No. 755,935, dated March 29, 1904.

Application filed August 30, 1902. Serial No. 121,610. (No model.)

*To all whom it may concern:*

Be it known that I, WALTER F. REED, a citizen of the United States, residing at Camden, in the county of Kershaw and State of South Carolina, have invented certain new and useful Improvements in Clutch Mechanism for Mowing-Machines, of which the following is a specification.

My invention relates to mowing-machines, and more particularly to mechanism for throwing the same into and out of operation, the object thereof being to operate and control the same from the driver's seat with more ease and less expenditure of power than usual.

In the drawings forming a part of this specification and in which like symbols of reference represent corresponding parts in the several views, Figure 1 is a top plan view of the device; Fig. 2, a bottom plan of the same; Fig. 3, a detail of the clutch mechanism. Fig. 4 is a modification of clutch; and Fig. 5 is a view of the finger-bar, showing the connection of the chain to the same. Fig. $5^a$ is a view showing the finger-bar locked in its elevated position; and Fig. 6 a transverse section of the clutch, showing the connection of the bifurcated arms to the same.

1 represents the wheels of the device; 2, the axle thereof; 3, the sleeve forming a bearing for the axle; 4, the pole of the device, and 5 and 6 arms supported from the bearing or sleeve and connected with and supporting the finger-bar by a bolt 7. Arm 5 is formed with an eye to embrace the sleeve; but arm 6 is coupled in the usual manner by ears and a pin.

8 is a bell-crank pivotally connected at 9 to a plate on arm 5 and being in turn connected by a chain 10 with a lug or projection 11 on the finger-bar. The bell-crank is also connected by a link 12 with a hand-lever 13, said hand-lever being directed and guarded in its movements by a guide 14, connected to the arm 5. A second link 15 is also connected to the same end of the bell-crank as lever 12 and is connected by a lug or projection 16 with section 17 of a clutch-hub, said part 17 being loose on the axle 2 of the machine. 18 represents the other section of the clutch-hub, the same being keyed or rigidly connected to the shaft or axle 2, so as to prevent rotary motion, but permit longitudinal movement of the same, and being adapted to be thrown into or out of operation by a hand-lever 19, said hand-lever having a bifurcated end 20, embracing the circumferential groove in the part 18 of the clutch-hub, and thus move said section when desired on the axle 2. The lever 19 also has stirrups or arms 29, so that the same may be operated by foot, if desired. The ends of the bifurcated arms 20 are connected by a strap 21 and bolts $21^a$, said strap also supporting a rod 22 in a recess $22^a$, formed in the same and having a transverse pin $23^a$ to hold the rod in place, said rod being also journaled in eyes 23 24 on the sleeve 3 and having also a pin 25 resting in a fork 26 of an angular lever 27, said angular lever supported at 28 to the sleeve 3.

The hand-lever 13 is pivotally connected at 30 to a bracket 31, supported on the arm 5, and has a pawl 32 working in eyes 33 on the side of the same.

34 is a segment or segmental rack behind which the pawl is adapted to slide, and thus engage and hold the lever 13.

35 is a spring, and 36 a lug adapted to bear against the same when the finger-bar is raised, and thus prevent it from passing beyond the perpendicular. When, however, it is desired to throw the finger-bar completely out of operation, said spring is depressed, and the lug 36 passing beneath or behind the same thus locks the bar in an inclined position.

In the modification of the clutch shown in Fig. 4, $17^b$ represents the free, and $18^b$ the keyed, reciprocating part of the hub. $19^b$ is a bracket upon which is supported a foot-lever $20^b$, the same having forked ends $21^b$, upon the ends of which are friction-rollers $22^b$, and upon the end $23^b$ of lever $20^b$ is a spring $24^b$, connecting the same to the axle-bearing. Thus when the foot-piece of lever $20^b$ is depressed against the power of said spring the clutch is locked, and when pressure of the foot is removed the hub is unlocked by the power of the spring.

The operation of the device is as follows: When it is desired to raise the finger-bar, the lever 19 is operated and the section 18 of the clutch-hub thrown into engagement with the other section, 17, the turning of the axle 2 thus raising the finger-bar and sending the pawl 32 behind the segment 34, locking the same. When the lever and pawl have reached the locked position, the lug 16 on the section 17 comes in contact with the free end 37 of the angular lever 27, and thus the rod 22 is shifted and in turn operates to unlock the clutch, thus automatically releasing the finger-bar.

Having now fully described my invention, what I claim as new, and desire to secure by Letters Patent, is—

1. In a mowing-machine, the combination with the axle of the same, of a clutch upon the axle, said clutch having a loose section and a longitudinally-adjustable section, connections between the loose section and finger-bar, and a lever connected with the longitudinally-adjustable section for operating the same.

2. In a mowing-machine, a clutch having a loose section and a longitudinally-adjustable section, connections between the loose section and finger-bar, whereby as the clutch members are engaged the bar is elevated by the motion of the machine, and means for automatically releasing the clutch after the finger-bar has been elevated.

3. In a mowing-machine, a clutch, a lever for operating the same, a finger-bar, arms supporting the finger-bar, connections between the loose member of the clutch and finger-bar, comprising a lug upon said member of the clutch, a main bearing, an angular lever pivotally connected to the main bearing, and connections between said angular lever and one of the clutch members whereby when the bar has reached the limit of its movement the lug contacts with the angular lever and the clutch is unlocked.

4. In a mowing-machine, a main bearing, an axle, a clutch, composed of a loose and a longitudinally-adjustable member, said clutch supported upon the axle, means for operating the clutch, a lug connected to the loose member of the clutch, a finger-bar, a rod supported in eyes upon the axle-bearing, connections between said rod and the longitudinally-adjustable member, a pin on said rod, an angular lever pivotally connected to the axle-bearing, connections between the angular lever and rod, and connections between the loose member and finger-bar.

5. In a mowing-machine, a finger-bar, arms supporting the finger-bar, a depressible spring upon one of the arms, said spring having a hooked end, a lug on the finger-bar adapted to contact with the hooked end and limit the movement of the finger-bar beyond the perpendicular, said spring adapted to be depressed and lock the bar in its elevated position.

In testimony whereof I affix my signature in presence of two witnesses.

WALTER F. REED.

Witnesses:
J. E. VAUGHAN, Jr.,
S. LOGAN LANG.